United States Patent Office 3,470,956
Patented Oct. 7, 1969

3,470,956
RECOVERY OF OIL BY WATERFLOODING FROM AN ARGILLACEOUS, OIL-CONTAINING SUBTERRANEAN FORMATION
William G. Boston, Carl F. Brandner, and William R. Foster, Dallas, Tex., assignors to Mobil Oil Corporation, a corporation of New York
No Drawing. Filed May 2, 1968, Ser. No. 726,221
Int. Cl. E21b 43/20
U.S. Cl. 166—273          15 Claims

ABSTRACT OF THE DISCLOSURE

This specification discloses a procedure for recovering oil from an argillaceous, oil-containing subterranean formation wherein the permeability of the more permeable domains of the formation is reduced so as to reduce premature breakthrough of flooding water. The procedure involves injecting saline flooding water, containing a hydrocarbon sulfonate as a surfactant, into the formation. Thereafter, water substantially free of surfactant and having about the same salinity as the flooding water is injected into the formation. Next, water substantially free of surfactant and having a salinity at least one-quarter but not greater than one-half of that of the water injected into the formation in the preceding step is injected into the formation. Flooding water is then injected into the formation.

BACKGROUND OF THE INVENTION

This invention relates to the recovery of oil by waterflooding from an oil-containing subterranean formation and relates more particularly to the recovery of oil by waterflooding from such a formation which also contains clay.

Oil may be recovered from an oil-containing subterranean formation by a process called "waterflooding." In this type of operation, flooding water is injected into the formation through one or more injection wells leading to the formation from the surface of the earth. The water injected into the formation displaces the oil and moves it through the formation in the direction of one or more production wells leading from the formation to the surface of the earth. The oil can then be recovered from the production well or wells.

In the waterflooding process, the lower the interfacial tension between the water employed in the process and the oil in the formation, the greater will be the extent to which the oil is removed from those portions of the formation through which the flooding water passes. Commonly, the interfacial tension between the flooding water and the oil contained in the formation is lowered by adding a surfactant to the flooding water. With certain surfactants, such as a hydrocarbon sulfonate, the interfacial tension is further lowered where the flooding water is saline, i.e., contains sodium chloride.

Various subterranean formations containing oil also contain clay and these formations are termed "argillaceous formations." Clay tends to hydrate and swell when contacted with fresh water, i.e., water free of sodium chloride and other salts or water containing salts in amounts insufficient to prevent swelling and hydration of the clay. As a result of the hydration and swelling of the clay, the permeability of the formation to the water is reduced. Accordingly, if fresh water is employed as flooding water, for any given pressure of injection of the flooding water into the formation, the rate at which the flooding water can be injected through the injection well or wells into the formation is reduced. As a consequence, the rate at which oil can be recovered is reduced. Thus, from the standpoint of maintaining the injectivity of a well, namely, the rate of injection of flooding water into the formation per unit area of formation at the well per unit drop of pressure between the injection well and the production well, saline flooding water is employed.

Whereas reducing the interfacial tension between the flooding water and the oil within the formation increases the extent to which the oil is recovered from those portions of the formation through which the flooding water passes, another factor influences the extent of recovery of the oil. This factor is premature breakthrough. Premature breakthrough is the result, among other causes, of differences in permeability of different domains of the formation. In the domains of high permeability, the flooding water passes through relatively rapidly, and in the domains of low permeability, the flooding water passes through relatively slowly. Accordingly, the greater portion of the flooding water passes through the domains of high permeability and enters the production well or wells before the water passing through the domains of low permeability. After the water enters the production well or wells it no longer effects production of oil. Thus, premature breakthrough reduces the efficiency of the waterflood in proportion to the degree of prematurity of breakthrough. Various procedures employing a plugging agent to effect selective reduction in permeability of the more permeable domains of the formation have been carried out to reduce premature breakthrough of the flooding water.

SUMMARY OF THE INVENTION

In accordance with the invention, in a process for recovering oil from an argillaceous, oil-containing subterranean formation, as a first step, a slug of saline flooding water containing a hydrocarbon sulfonate dissolved therein as a surfactant is injected into the formation. Immediately thereafter, as a second step, there is injected into the formation a slug of water substantially free of hydrocarbon sulfonate and having about the same salinity as that of the saline flooding water containing the dissolved hydrocarbon sulfonate injected into the formation in the preceding step. As a third step, immediately thereafter there is injected into the formation a slug of water substantially free of hydrocarbon sulfonate and having a salinity at least one-quarter but not greater than one-half of that of the slug of saline water injected into the formation in the second step. Thereafter, flooding water is injected into the formation.

DESCRIPTION OF THE PREFERRED EMBODIMENTS

The invention is based upon the discovery that, following the injection of a saline solution of a hydrocarbon sulfonate into an argillaceous, subterranean formation, the injection of less-saline water will produce within the formation a less-saline solution of the hydrocarbon sulfonate and this less-saline solution of the hydrocarbon sulfonate effects a dispersion of the clay, and any silt, in the formation. The clay, and silt, upon dispersion, become mobile and follow the paths taken by the greatest proportion of the flowing water. These paths are the domains of higher permeability and the mobile clay, and silt, become lodged in the smaller pore spaces of these domains of the formation and reduce the flow of water through these pore spaces. The permeability of the domains where the clay, and silt, lodge is accordingly reduced and the water is forced to take other flow paths. As a result, the permeabilities of the various domains within the formation become more uniform. Reduction in permeability in the more permeable domains improves the mobility ratio of the waterflood. Premature breakthrough thus becomes reduced and the efficiency of the waterflood is improved.

The production within the formation of the less-saline solution of the hydrocarbon sulfonate is the result of two mechanisms. The first mechanism is desorption of hydrocarbon sulfonate that has been adsorbed on the surfaces of the formation from the saline solution of the hydrocarbon sulfonate injected into the formation. At equilibrium, the amount of hydrocarbon sulfonate in solution in the less-saline water as compared with the amount of hydrocarbon sulfonate remaining adsorbed on the surfaces of the formation is favored by decreasing salinity of the solution. Thus, the less-saline water substantially free of hydrocarbon sulfonate is capable of desorbing hydrocarbon sulfonate from the surfaces of the formation and the desorbed hydrocarbon sulfonate dissolves in the less-saline water. The second mechanism is mixing of the less-saline water with the preceding slug of saline flooding water containing the hydrocarbon sulfonate dissolved therein. Thus, as the slug of less-saline water passes from the injection well into the formation it desorbs hydrocarbon sulfonate and mixes with the saline flooding water containing the hydrocarbon sulfonate dissolved therein to form the less-saline solution of the hydrocarbon sulfonate which disperses the clay in the formation.

As mentioned, a slug of water substantially free of surfactant and having the same salinity as that of the saline flooding water containing the dissolved hydrocarbon sulfonate is injected into the formation immediately after the slug of saline flooding water containing the dissolved hydrocarbon sulfonate. This step is essential to minimize reduction in the injectivity of the injection well. As the less-saline water substantially free of hydrocarbon sulfonate enters the formation from the injection well, it immediately begins to desorb adsorbed hydrocarbon sulfonate and mix with the preceding slug of liquid. If this preceding slug of liquid were the saline flooding water containing the hydrocarbon sulfonate dissolved therein, a less-saline solution of hydrocarbon sulfonate capable of dispersing clay would form within a comparatively short distance of the injection well resulting in decrease in the injectivity of the well. However, by injecting the slug of water substantially free of hydrocarbon sulfonate and having about the same salinity as that of the saline flooding water prior to injecting the slug of fresher water, the slug of fresher water, while desorbing adsorbed hydrocarbon sulfonate, mixes with this slug of water substantially free of hydrocarbon sulfonate rather than with the saline water containing the hydrocarbon sulfonate. As a result, the slug of fresher water has to travel a comparatively greater distance into the formation before its concentration of hydrocarbon sulfonate becomes sufficiently high to effect dispersion of clay. Thus, the reduction in permeability caused by the dispersion of clay does not occur in the vicinity of the injection well but occurs within the formation to reduce the permeability in the more permeable domains of the formation with only minor effect on the injectivity of the well.

In the practice of the invention, any hydrocarbon sulfonate capable of reducing the interfacial tension between the solution thereof and the oil in the formation may be employed. For example, a hydrocarbon sulfonate such as an alkyl aryl sulfonate may be employed. The alkyl aryl sulfonate may be an alkyl aryl naphthenic sulfonate. Preferably, a mixture of hydrocarbon sulfonates is employed. Thus, petroleum sulfonates may be employed. An effective hydrocarbon sulfonate is a mixture of alkyl aryl naphthenic sulfonates or alkyl aryl sulfonates having a mean, or average, molecular weight from 320 to 500. The molecular weights are those of the sulfonates in the form of their sodium salts. Further, the term "molecular weight" should be understood to mean equivalent weight, which is defined as molecular weight per sulfonate group and such term is used because it is commonly applied by manufacturers of hydrocarbon sulfonates in describing their products. The hydrocarbon sulfonates may also be employed in the acid form or in the form of a salt. The acid form is corrosive and the hydrocarbon sulfonates are preferably employed in the form of a neutral salt. Of these, the sodium salt is preferred.

The concentration of hydrocarbon sulfonate in the saline flooding water may be any concentration effecting a decrease in the interfacial tension between the solution and the oil in the formation. Preferably, the concentration should be at least 0.001 percent by weight of the flooding water. The concentration may be as high as 3.0 percent by weight.

Heretofore, and hereinafter, in referring to the saline flooding water containing the hydrocarbon sulfonate, it is variously stated that the hydrocarbon sulfonate is dissolved in the water or the water containing the hydrocarbon sulfonate is a solution of the hydrocarbon sulfonate. The terms "dissolved" and "solution" are intended to encompass hydrocarbon sulfonate dispersed in water and dispersions of hydrocarbon sulfonate in water, respectively. As is known, hydrocarbon sulfonate dissolves in water to form a true solution and may also disperse in water. The dispersions, however, are not gross dispersions. They may, within limits of amounts of hydrocarbon sulfonate mixed with water, be employed without filtration of the hydrocarbon sulfonate from the water at the surface of the formation at the injection well.

The amount of saline flooding water containing the hydrocarbon sulfonate may be any amount conventionally employed. Thus, the amount may be 0.02 pore volume of the formation swept by the flooding water. The amount may be as high as 0.2 pore volume. Greater amounts may also be employed.

The amount of sodium chloride in the saline flooding water containing the hydrocarbon sulfonate should be at least 0.5 percent by weight of the flooding water. With this amount, satisfactory decrease in the interfacial tension between the flooding water and the oil in the formation and satisfactory prevention of swelling of clay are obtained. Greater amounts of sodium chloride can, of course, be employed. Thus, the amount of sodium chloride may be as high as 2 percent by weight. Ordinarily, higher concentrations of sodium chloride are to be avoided since higher concentrations are incompatible with aqueous solutions of hydrocarbon sulfonate. The saline flooding water containing the hydrocarbon sulfonate should be substantially free of salts having divalent cations such as calcium and magnesium salts since these react with hydrocarbon sulfonates to precipitate the sulfonates and render them ineffective.

The slug of water substantially free of surfactant injected into the formation immediately following the saline flooding water containing the hydrocarbon sulfonate will have about the same salinity as the saline flooding water. It is not essential that the salinity be precisely the same. However, the salinity should not be too much different from that of the saline flooding water containing the hydrocarbon sulfonate. For example, if the salinity is too greatly in excess of that of the saline flooding water, it may be so high as to be incompatible with the hydrocarbon sulfonate and, upon mixing with the preceding slug of saline flooding water, deleteriously affect at least some of the hydrocarbon sulfonate. If the salinity is too greatly below that of the saline flooding water, it will desorb hydrocarbon sulfonate which, in addition to the mixing with the saline flooding water, will provide a solution of hydrocarbon sulfonate of the necessarily low salinity to effect dispersion of clay near the injection well to reduce unduly the injectivity of the well. Preferably, the salinity of the slug of water substantially free of hydrocarbon sulfonate should be within 10 percent of that of the saline flooding water containing the hydrocarbon sulfonate. For example, if the salinity of the saline flooding water is 2.0 percent by weight, the salinity of the slug of water substantially free of hydrocarbon sulfonate should be between 1.8 and 2.2 percent by weight. This slug of water should also be free of salts having divalent cations.

The amount of the slug of water substantially free of hydrocarbon sulfonate and having about the same salinity as that of the saline flooding water injected into the formation is best expressed in figures representing actual quantities flowing through a given volume of reservoir. The amount should be at least 2 barrels per foot of formation measured vertically adjacent to the injection well. The amount may be as high as 200 barrels per foot of formation. Greater amounts may also be employed depending upon the distance within the formation measured from the injection well at which it is desired dispersion of the clay is to begin.

It is preferred that the slug of water substantially free of surfactant and having about the same salinity as that of the saline flooding water be entirely free of surfactant. To the extent that this slug of water is free of surfactant, the further inwardly from the injection well, for any given amount of this water, will dispersion of the clay occur. Thus, for any given amount of the water, the chance of significant decrease in the injectivity of the well is at minimum when the slug of water is entirely free of surfactant. On the other hand, where a slight decrease in injectivity can be tolerated, the slug of water may contain, as compared to the slug of flooding water preceding it in the formation, a minor amount of surfactant.

Following the slug of water substantially free of hydrocarbon sulfonate and having about the same salinity as that of the saline flooding water, there is injected into the formation the slug of water substantially free of surfactant and having a salinity at least one-quarter but not greater than one-half of that of the slug of water injected into the formation in the preceding step. While the salinity of this slug of water may be as high as one-half of that of the slug of water injected into the formation in the previous step, it is preferred that the salinity be one-quarter of that of the slug of water injected into the formation in the previous step. The less-saline the water, the greater is the effect on the dispersion of clay, and silt, in the formation. On the other hand, if the salinity of this slug of water is too low, hydration of the clay in the formation at the injection well can occur to reduce unduly the injectivity of the well. The water, thus, contains at least 0.125 percent by weight of sodium chloride. Depending upon the salinity of the slug of water injected into the formation in the preceding step, this slug of water may contain up to 1.1 percent by weight of sodium chloride. This slug of water should also be free of salts containing divalent cations.

The amount of water employed in the third step of the process should be at least as great as 0.05 of the formation swept by the flooding water. The amount may be as high as 0.5 pore volume. Greater amounts may also be employed.

The water employed in the third step of the process, similar to that employed in the second step, is substantially free of surfactant. Preferably, this water is entirely free of surfactant. However, for the reason set forth above in connection with the water employed in the second step, the water may contain a minor amount of surfactant.

In the subsequent step of the process, flooding water is injected into the formaation. This water may be any water ordinarily employed for flooding. Thus, the water may be fresh water or may be salt water such as oil field brine. This water is injected in sufficient amount to effect production of oil from the production well or wells.

In carrying out the process of the invention, where the formation contains brine or high sodium chloride content, or of other salts including those having divalent cations, it is preferred to inject a slug of fresh water or water having a salt content compatible with the hydrocarbon sulfonate into the formation prior to injecting the saline flooding water containing the hydrocarbon sulfonate. In this way, the brine in the formation is displaced from the formation by this buffer slug of water and provides a buffer zone between the brine in the formation and the flooding water.

If desired, various types of agents may be added to one or more of the liquids injected into the formation to impart additional properties to the liquids. Thus, a thickening agent may be added to one or more of the liquids where additional viscosity is desired and the thickening agent is compatible with the system.

The process of the invention may be carried out in a formation as a primary recovery operation where the native reservoir energy is insufficient to effect production of the oil. It may also be carried out in a formation following a preceding recovery operation or operations. Thus, it may be carried out following recovery of oil by utilization of native reservoir energy or following a secondary recovery procedure.

In carrying out the various steps of the invention, the various liquids injected into the formation will ordinarily be injected into the formation through the same injection well.

What is claimed is:

1. In a process for recovering oil from an argillaceous, oil-containing subterranean formation, the steps comprising:
    (a) injecting into said formation a slug of saline flooding water containing a hydrocarbon sulfonate,
    (b) immediately thereafter injecting into said formation a slug of water substantially free of hydrocarbon sulfonate and having about the same salinity as that of said saline flooding water containing a hydrocarbon sulfonate,
    (c) immediately thereafter injecting into said formation a slug of water substantially free of hydrocarbon sulfonate and having a salinity of at least one-quarter but not greater than one-half of that of said preceding slug of water,
    (d) thereafter injecting flooding water into said formation, and
    (e) recovering oil from said formation.

2. The process of claim 1 wherein said hydrocarbon sulfonate is an alkyl aryl sulfonate.

3. The process of claim 2 wherein said alkyl aryl sulfonate is an alkyl aryl naphthenic sulfonate.

4. The process of claim 1 wherein said hydrocarbon sulfonate is petroleum sulfonate.

5. The process of claim 4 wherein said petroleum sulfonate is a mixture thereof and has a molecular weight between 320 and 500.

6. The process of claim 1 wherein said hydrocarbon sulfonate is contained in said saline flooding water in an amount between 0.001 and 3.0 percent by weight of the water.

7. The process of claim 1 wherein said saline flooding water is injected into said formation in an amount between 0.02 and 0.2 pore volume.

8. The process of claim 1 wherein said saline flooding water has a salinity between 0.5 and 2 percent by weight of the flooding water.

9. The process of claim 1 wherein the salinity of said slug of water injected into said formation in step (b) is within 10 percent of that of said saline flooding water.

10. The process of claim 1 wherein said slug of water injected into said formation in step (b) is injected in an amount between 2 and 200 barrels per foot of formation.

11. The process of claim 1 wherein said slug of water injected into said formation in step (b) is entirely free of hydrocarbon sulfonate.

12. The process of claim 1 wherein said slug of water injected into said formation is step (c) has a salinity between 0.125 and 1.1 percent by weight.

13. The process of claim 1 wherein said slug of water injected into said formation in step (c) is in an amount between 0.05 and 0.5 pore volume.

14. The process of claim 1 wherein said slug of water injected into said formation in step (c) is entirely free of hydrocarbon sulfonate.

15. The process of claim 1 wherein said hydrocarbon sulfonate is petroleum sulfonate and is contained in said saline flooding water in an amount between 0.001 and 3.0 percent by weight of the water, said saline flooding water is injected into said formation in an amount between 0.02 and 0.2 pore volume and has a salinity between 0.5 and 2 percent by weight, said slug of water injected into said formation in step (b) has a salinity within 10 percent of that of said saline flooding water, is injected into said formation in an amount between 2 and 200 barrels per foot of formation, and is entirely free of petroleum sulfonate, and said slug of water injected into said formation in step (c) has a salinity between 0.125 and 1.1 percent by weight, is injected into said formation in an amount between 0.05 and 0.5 pore volume, and is entirely free of petroleum sulfonate.

References Cited

UNITED STATES PATENTS

| | | | |
|---|---|---|---|
| 3,123,135 | 3/1964 | Bernard et al. | 166—9 |
| 3,208,528 | 9/1965 | Elliott et al. | 166—9 X |
| 3,289,759 | 12/1966 | Fisher | 166—9 |
| 3,302,713 | 2/1967 | Ahearn et al. | 166—9 |
| 3,346,047 | 10/1967 | Townsend et al. | 166—9 |
| 3,369,602 | 2/1968 | Fallgatter et al. | 166—9 |
| 3,368,621 | 2/1968 | Reisberg | 166—9 |
| 3,373,808 | 3/1968 | Patton | 166—9 |

CHARLES E. O'CONNELL, Primary Examiner

IAN A. CALVERT, Assistant Examiner

PO-1050
(5/69)

UNITED STATES PATENT OFFICE
CERTIFICATE OF CORRECTION

Patent No. 3,470,956          Dated October 7, 1969

Inventor(s) William G. Boston, Carl F. Brandner, and William R. Fo

It is certified that error appears in the above-identified patent and that said Letters Patent are hereby corrected as shown below:

Column 5, line 65, after "brine", change "or" to --of--.

Claim 12, line 2, "is" should be --in--.

SIGNED AND
SEALED
JAN 6 - 1970

(SEAL)
Attest:

Edward M. Fletcher, Jr.
Attesting Officer

WILLIAM E. SCHUYLER, JR.
Commissioner of Patents